United States Patent
Moss et al.

(10) Patent No.: US 11,157,212 B2
(45) Date of Patent: Oct. 26, 2021

(54) VIRTUAL CONTROLLER MEMORY BUFFER

(71) Applicant: Seagate Technology LLC, Fremont, CA (US)

(72) Inventors: Robert Wayne Moss, Windsor, CO (US); Thomas V. Spencer, Fort Collins, CO (US); Eric James Behnke, Boulder, CO (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 16/946,096

(22) Filed: Jun. 5, 2020

(65) Prior Publication Data

US 2021/0191657 A1    Jun. 24, 2021

Related U.S. Application Data

(60) Provisional application No. 62/950,439, filed on Dec. 19, 2019.

(51) Int. Cl.
G06F 3/06    (2006.01)

(52) U.S. Cl.
CPC .......... G06F 3/0659 (2013.01); G06F 3/0614 (2013.01); G06F 3/0656 (2013.01); G06F 3/0662 (2013.01); G06F 3/0688 (2013.01)

(58) Field of Classification Search
CPC .... G06F 3/0659; G06F 3/0614; G06F 3/0656; G06F 3/0662; G06F 3/0688
See application file for complete search history.

(56) References Cited

U.S. PATENT DOCUMENTS

| 8,954,656 | B2 | 2/2015 | Thomas |
| 9,430,412 | B2 | 8/2016 | Huang |
| 9,501,245 | B2 * | 11/2016 | Hussain ................. G06F 3/067 |

(Continued)

FOREIGN PATENT DOCUMENTS

WO    2018201249 A1    11/2018

OTHER PUBLICATIONS

Bates, Stephen. "Donard: NVM Express for Peer-2-Peer between SSDs and other PCIe Devices." Storage Developer Conference, SNIA Santa Clara. 2015. (Year: 2015).*

*Primary Examiner* — Charles Rones
*Assistant Examiner* — Hewy H Li
(74) *Attorney, Agent, or Firm* — Hall Estill Law Firm

(57) ABSTRACT

Method and apparatus for managing data transfers. In some embodiments, first and second storage devices respectively include first and second controllers, first and second local memories, and first and second non-volatile memories (NVMs). A virtual controller memory buffer (CMB) is formed from a dedicated portion of each of the first and second local memories for control by a host device. The first controller receives a virtual command set from the host device, and extracts a first local command to transfer data between the host device and the first NVM. In some cases, the second controller also receives the virtual command set and concurrently extracts a different, second local command to transfer data between the host device and the second NVM. Alternatively, the first controller may extract and forward the second local command to the second controller. The first and second NVMs may form an NVMe (Non-Volatile Memory Express) namespace.

20 Claims, 6 Drawing Sheets

(56) References Cited

U.S. PATENT DOCUMENTS

| | | | |
|---|---|---|---|
| 10,114,586 B1* | 10/2018 | Benisty | G06F 3/0679 |
| 10,860,508 B2* | 12/2020 | Bolkhovitin | G06F 3/0604 |
| 2015/0261446 A1 | 9/2015 | Lee | |
| 2018/0260145 A1* | 9/2018 | Margetts | G06F 13/1668 |
| 2019/0146712 A1* | 5/2019 | Lee | G06F 3/0659 |
| | | | 711/103 |
| 2019/0294344 A1 | 9/2019 | Hahn et al. | |

* cited by examiner

VIRTUAL CONTROLLER MEMORY BUFFER

RELATED APPLICATION

The present application makes a claim of domestic priority under 35 U.S.C. 119(e) to U.S. Provisional Patent Application No. 62/950,439 filed Dec. 19, 2019, the contents of which are hereby incorporated by reference.

SUMMARY

Various embodiments of the present disclosure are generally directed to a method and apparatus for managing the transfer of data in a data storage system using a virtual controller memory buffer.

In some embodiments, a host device is coupled to each of first and second data storage devices. The first and second storage devices respectively include first and second controllers, first and second local memories, and first and second non-volatile memories (NVM). A virtual controller memory buffer (CMB) is formed from a dedicated portion of each of the first and second local memories for control by the host device. The first controller receives a virtual command set from the host device, and extracts a first local command therefrom for execution to transfer data between the host device and the first NVM.

In further embodiments, the second controller receives the virtual command set and concurrently extracts a different, second local command for execution to transfer data between the host device and the second NVM. Alternatively, the first controller may extract and forward the second local command to the second controller.

These and other features and advantages which characterize the various embodiments of the present disclosure can be understood in view of the following detailed discussion and the accompanying drawings.

DETAILED DESCRIPTION

Figure 1:
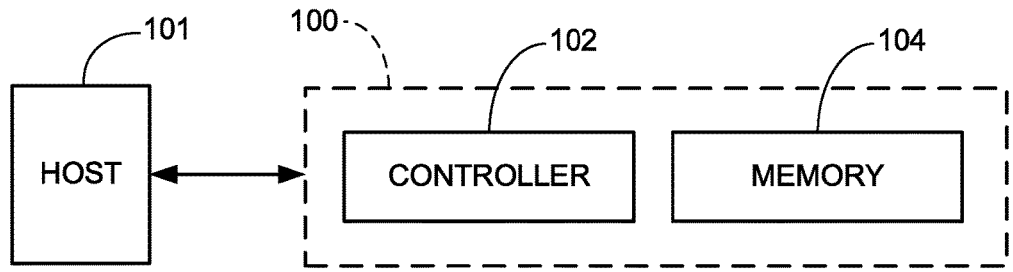
FIG. 1 provides a functional block representation of a data storage device constructed and operated in accordance with various embodiments of the present disclosure.

The present disclosure generally relates to systems and methods for managing data in a non-volatile memory (NVM).

Many current generation data storage devices such as solid-state drives (SSDs) utilize NAND flash memory to provide non-volatile storage of data from a host device. It can be advantageous to operate an SSD in accordance with the NVMe (Non-Volatile Memory Express) specification, which provides a scalable protocol optimized for efficient data transfers between users and flash memory.

NVMe primarily uses the PCIe (Peripheral Component Interface Express) interface protocol, although other interfaces have been proposed. NVMe uses a paired submission queue and completion queue mechanism to accommodate up to 64K commands per queue on up to 64K I/O queues for parallel operation.

NVMe further supports the use of namespaces, which are regions of flash memory dedicated for use and control by a separate user (host). The standard enables mass storage among multiple SSDs that may be grouped together to form one or more namespaces, each under independent control by a different host. In similar fashion, the flash NVM of a single SSD can be divided into multiple namespaces, each separately accessed and controlled by a different host through the same SSD controller.

A particular feature of the NVMe specification is referred to as a "Controller Memory Buffer," or CMB. A CMB generally allows a host to allocate a portion of the local controller memory in an SSD for exclusive use by the host. The memory used as the CMB space is usually part of the local memory (e.g., DRAM, etc.) of the SSD. This local memory may additionally be used by the SSD controller for other purposes such as to store firmware, readback data, metadata, etc. While not necessarily required, the CMB is usually volatile (e.g., non-persistent) so that the host contents are not retained upon power loss by the SSD.

The host can generally use the CMB space as desired, including for the purpose of calculating and/or storing data for host related operations (e.g., parity values, tables, etc.). In practice, a host may often use the CMB to store access commands (e.g., read, write, flush, etc.) and data associated with the commands for execution by the SSD. In such case, the commands and data are transferred to the CMB over a normal host/device interface (e.g., PCIe). The local storage of commands and data by the host in the local memory of the SSD facilitates enhanced operation of the system. The local SSD controller can service commands received from the host over the existing interface in a normal fashion, as well as service commands that were previously loaded to the CMB by the host In cases where a write command is being processed, the CMB based write command and the associated write data are taken directly from the CMB and executed to transfer the write data to the flash. In cases where a read command is being processed, the CMB based read command is taken directly from the CMB and executed to retrieve the requested data from flash. The retrieved readback data can be placed back in the CMB or sent across the interface to the host, as directed by the host. Receipt of the readback data in the designated location completes the command servicing. If the read data are placed in the CMB, the host may require a subsequent transfer of the data across the interface to the host for its own use. For these reasons, the use of a CMB can reduce the bandwidth and operational performance of an SSD in some circumstances.

Various embodiments of the present disclosure address these and other limitations with the existing art by providing an improved CMB strategy where multiple controllers are used to support a particular host, such as but not limited to a system in which a namespace spans at least portions of two SSDs or other forms of data storage devices.

A virtualized controller memory buffer ("VCMB" or "virtual CMB") is formed by the host. The VCMB is generally operated as a conventional CMB in accordance with the NVMe specification, except as described herein. The VCMB utilizes selected portions of the local memory of the two (or more) respective storage devices. The two (or more) controllers may be virtualized as a single controller to manage the transfers with the VCMB and the namespace.

The solution treats the VCMB as a single congruent memory even though the VCMB extends across the physical memory of two (or more) controllers. Read/write commands that are required by the host are presented by the host to this virtualized memory space, and the respective controllers operate to divide and assign the commands in a granular way so that the aggregate bandwidth of the memories in each of the controllers contribute to the net bandwidth available for the logical VCMB space.

Accommodating the VCMB may tend to require some additional intelligence at the controller level. Normally, the space that is allocated as a CMB is in a "hands off" state; that is, the controller responds to CMB commands from the host to place the desired contents in the desired addresses, and read the commands for execution as directed. This approach may require front and back end coordination by the local controllers, including the routing of the appropriate commands to the appropriate devices, as well as tracking and synchronizing the execution of the commands.

In some cases, each of the controllers will receive a virtual command set from the host device and independently extract that portion of the virtual command set that can be carried out by the associated storage device, leaving the rest of the command set to be accomplished by the remaining device(s) in the namespace. In other cases, a selected controller may operate as a primary controller that coordinates and, as required, forwards commands to the remaining device(s) for execution. The controllers may further coordinate how much physical memory from each controller is allocated to the VCMB, may make adjustments to the allocated memory over time, etc. Tables and other forms of data structures may be utilized to track the progress and status of the issued commands to the VCMB space.

These and other features and advantages can be understood beginning with a review of FIG. 1, which provides a simplified functional block representation of a data storage device 100 constructed and operated in accordance with various embodiments of the present disclosure. The device 100 is characterized as a solid-state drive (SSD) that employs non-volatile semiconductor memory such as 3D NAND flash memory, although the present disclosure is not so limited. The device 100 provides a main store for data from a host device 101.

The device 100 includes a controller circuit 102 which provides top-level control and communication functions as the device interacts with the host device 101 to store and retrieve host user data. A memory module 104 provides non-volatile storage of the data in the form of an array of flash memory cells.

The controller 102 may be a programmable CPU processor that operates in conjunction with programming stored in a computer memory within the device. The controller may alternatively be a hardware controller. The controller may be a separate circuit or the controller functionality may be incorporated directly into the memory array 104.

As used herein, the term controller and the like will be broadly understood as an integrated circuit (IC) device or a group of interconnected IC devices that utilize a number of fundamental circuit elements such as but not limited to transistors, diodes, capacitors, resistors, inductors, waveguides, circuit paths, planes, printed circuit boards, memory elements, etc. to provide a functional circuit regardless whether the circuit is programmable or not. The controller may be arranged as a system on chip (SOC) IC device, a programmable processor, a state machine, a hardware circuit, a portion of a read channel in a memory module, etc.

Figure 2:
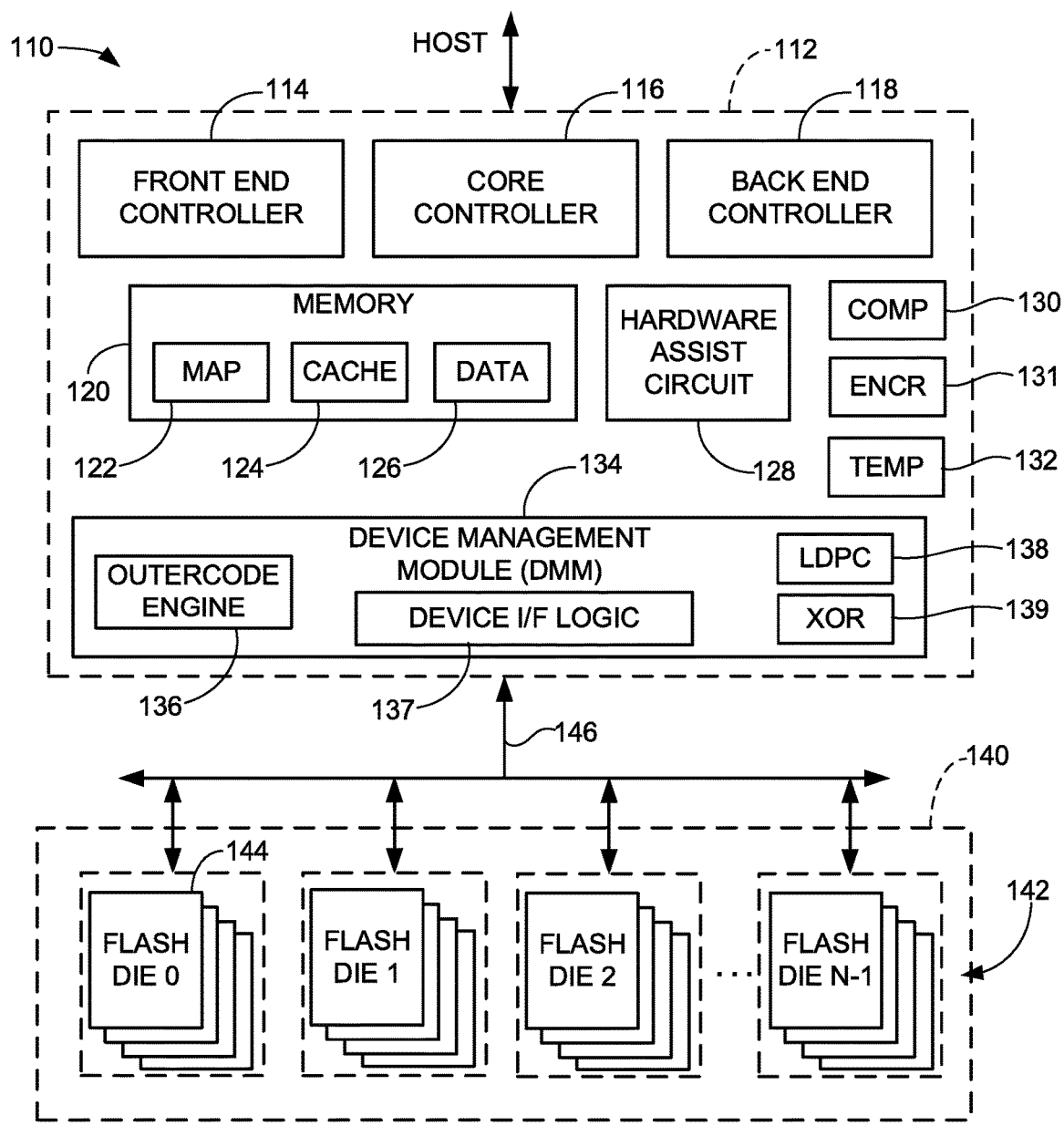
FIG. 2 illustrates the data storage device of FIG. 1 characterized as a solid state drive (SSD) that uses NAND flash memory in accordance with some embodiments.

In order to provide a detailed explanation of various embodiments, FIG. 2 has been provided to describe relevant aspects of an exemplary data storage device 110 corresponding to the device 100 of FIG. 1. The SSD 110 is shown in FIG. 2 to be configured as a solid state drive (SSD) that communicates with one or more host devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) specification, which enables different users to allocate NVM sets (die sets) for use in the storage of data. Each die set may forma portion of an NVMe namespace that may span multiple SSDs or be contained within a single SSD. Each namespace will be owned and controlled by a different user (host). While aspects of various embodiments are particularly applicable to devices operated in accordance with the NVMe specification, such is not necessarily required.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 112, such as a data compression block 130, an encryption block 131 and a temperature sensor block 132. The data compression block 130 applies lossless data compression to input data sets during write operations, and subsequently provides data de-compression during read operations. The encryption block 131 applies cryptographic functions including encryption, hashes, decompression, etc. The temperature sensor 132 senses temperature of the SSD at various locations.

A device management module (DMM) 134 supports back end processing operations and may include an outer code engine circuit 136 to generate outer code, a device I/F logic circuit 137, a low density parity check (LDPC) circuit 138 and an XOR (exclusive-or) buffer 139. The elements operate to condition the data presented to the SSD during write operations and to detect and correct bit errors in the data retrieved during read operations.

A memory module 140 corresponds to the memory 104 in FIG. 1 and includes a non-volatile memory (NVM) in the form of a flash memory 142 distributed across a plural number N of flash memory dies 144. Flash memory control electronics (not separately shown in FIG. 2) may be provisioned on each die 144 to facilitate parallel data transfer operations via a number of channels (lanes) 146.

Figure 3:
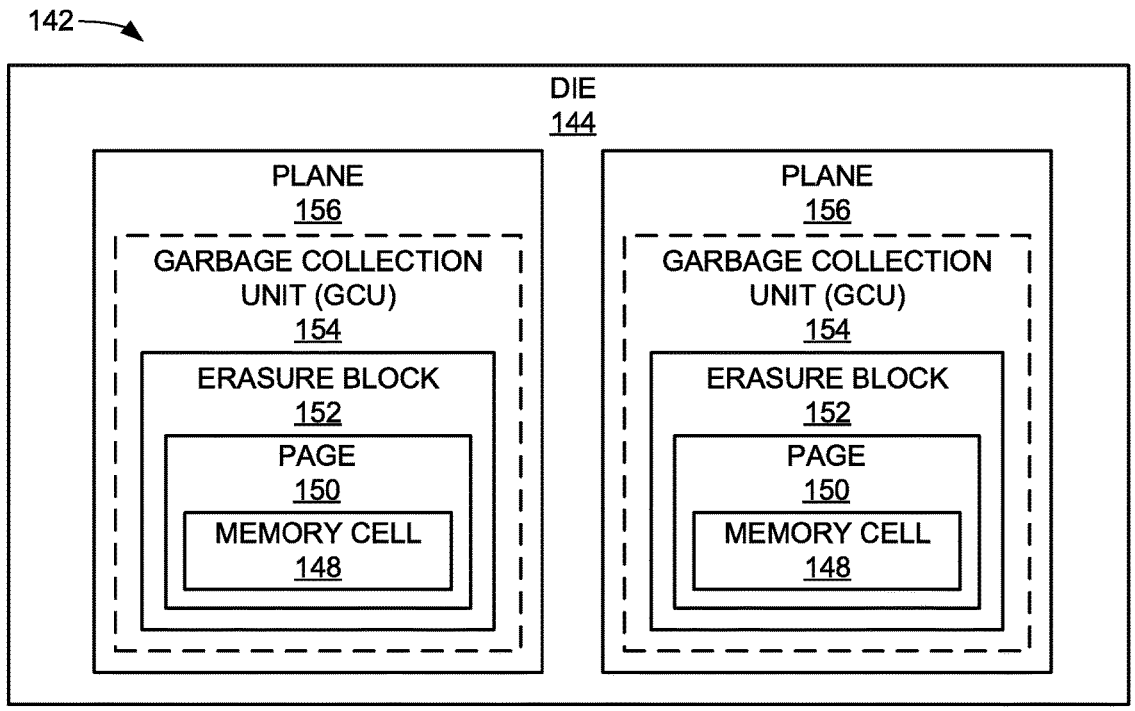
FIG. 3 is a physical and functional layout of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), QLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 16 KB (16,384 bytes) of user data. Other configurations can be used.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical storage units that utilize erasure blocks across different dies as explained below. GCUs are allocated and erased as a unit, and tend to span multiple dies.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four or eight planes per die can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
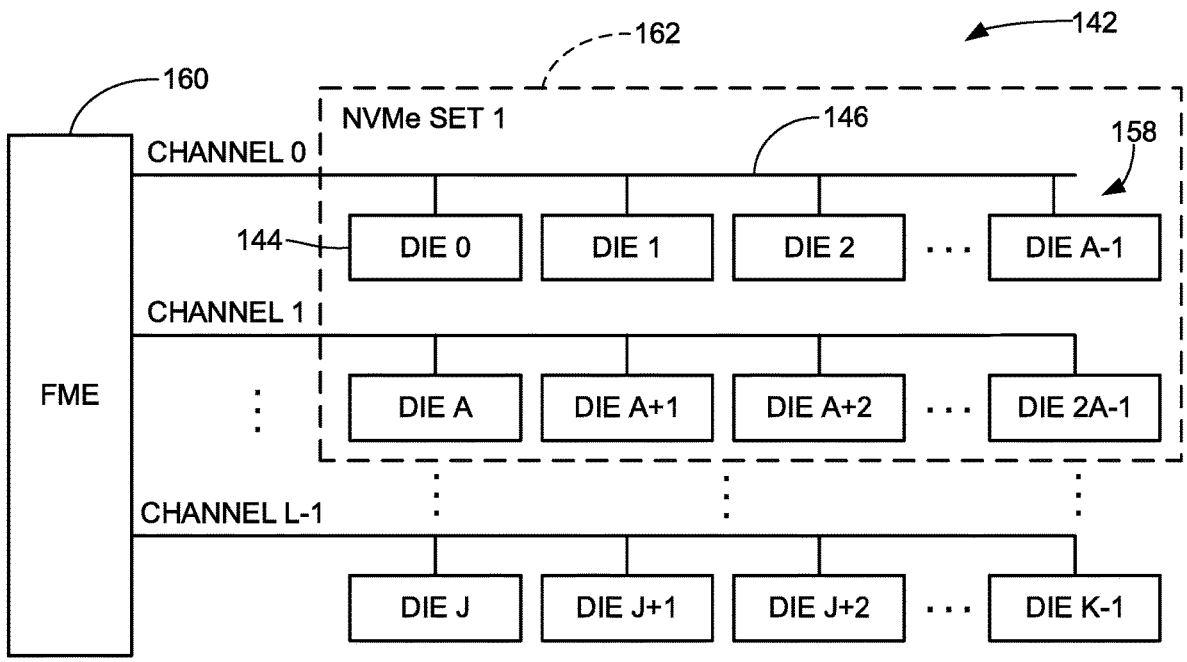
FIG. 4 shows the grouping of various dies of the flash memory of FIG. 2 in various die and NVM set configurations in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. Flash memory electronics (FME) circuitry 160 of the flash memory module 142 controls each of the channels 146 to transfer data to and from the respective die groups 158. In one non-limiting example, K is set to 128 dies, L is set to 8 channels, and each physical die group has 16 dies. In this way, any of the 16 dies physically connected to a given channel 146 can be accessed at a given time using the associated channel. Generally, only one die per channel can be accessed at a time.

In some embodiments, the various dies are arranged into one or more NVMe sets. An NVMe set, also referred to a die set or a namespace, represents a portion of the storage capacity of the SSD that is allocated for use by a particular host (user/owner). NVMe sets are usually established with a granularity at the die level, so that each NVMe set will encompass a selected number of the available dies 144. An example NVMe set is denoted at 162 in FIG. 4. This set 162 encompasses all of the dies 144 on channels 0 and 1, for a total of 32 dies. Other arrangements can be used, including a die set that (namespace) encompasses all of the dies in the SSD, etc.

Figure 5:
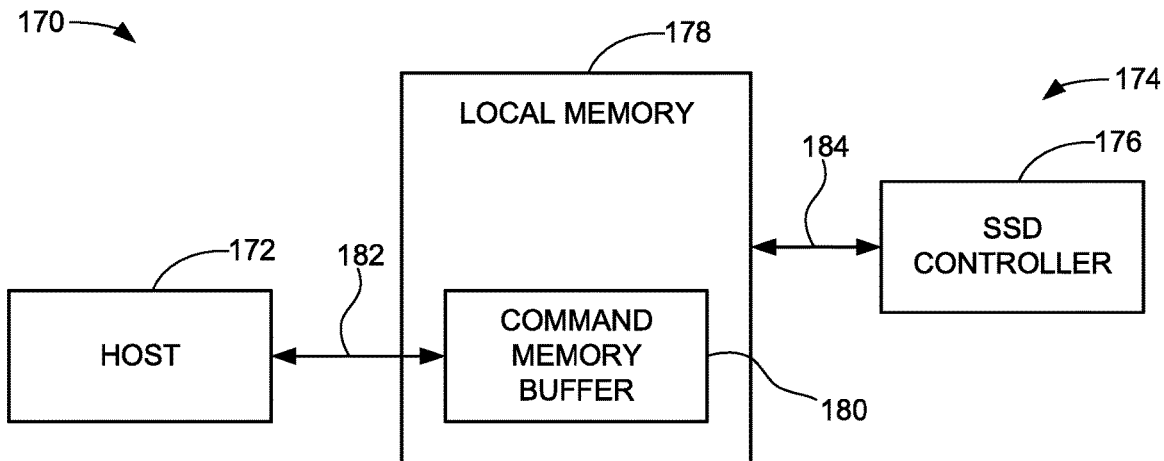
FIG. 5 illustrates the use of a controller memory buffer by a host to store commands and data in the local memory of the SSD of FIG. 2 in some embodiments.

FIG. 5 shows a storage system 170 that operates in accordance with some embodiments. The system 170 includes a host device 172 coupled to a storage device 174. The storage device 174 is an SSD that generally corresponds to the SSD 110 of FIG. 2. The SSD 174 includes an SSD controller 176, a local memory 178 and a non-volatile memory (NVM, not shown). The local memory may be a volatile random access memory such as DRAM or SRAM, etc. The host device 172 may be a computer or other control device (e.g., an external host controller, etc.) that is directly or indirectly under the control of an owner of a namespace of which the NVM of the storage device 174 forms a part.

The host 172 implements a controller memory buffer (CMB) 180 as an allocated portion of the local memory 178 for its own use. The CMB is partitioned to store commands and associated data from the host 172 in accordance with the NVMe specification. The contents of the CMB are passed to the SSD controller 176 over an existing interface 182 between the host 172 and the SSD 174 (such as a PCIe bus, etc.). The controller places the contents in the CMB at the designated addresses using one or more internal busses 184. When the host requires the contents in the CMB to be returned, the controller forwards the requested contents across these busses back to the host.

Figure 6A:
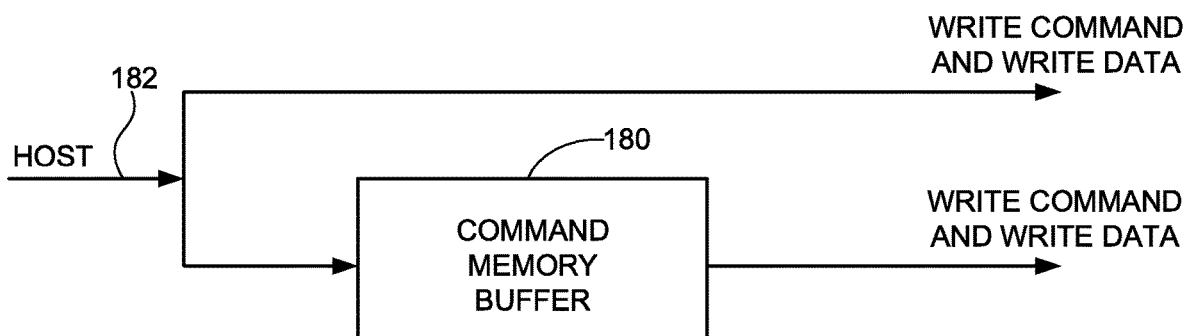
FIGS. 6A and 6B show different types of data transfer commands executed using the controller memory buffer of FIG. 5.
Figure 6B:
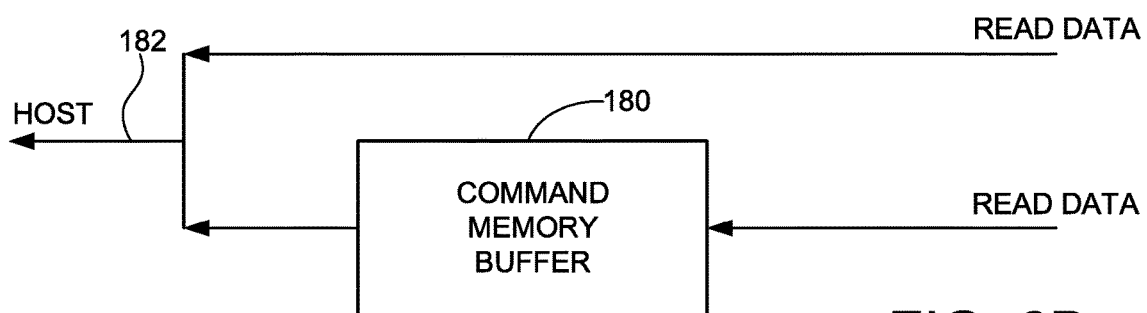

Operation of the CMB 180 can be described as set forth by FIGS. 6A and 6B. In FIG. 6A, the host has stored at least one write command and associated write data in the CMB 180. During operation, the SSD controller 176 retrieves the write command and processes the write data for storage to the NVM (flash) of the SSD 174. It will be noted that other write commands can be passed in a normal fashion to the SSD for servicing without utilizing the CMB 180.

In FIG. 6B, the host has stored at least one read command in the CMB 180. As before, the SSD controller 176 retrieves the read command and directs the flash of the SSD to retrieve the requested data. In this case, the retrieved data can be stored in the CMB 180, or the retrieved data can be forwarded directly to the host via the interface 182, as indicated by the host. Other read commands can similarly be processed in a manner that bypasses the CMB 180.

Figure 7:
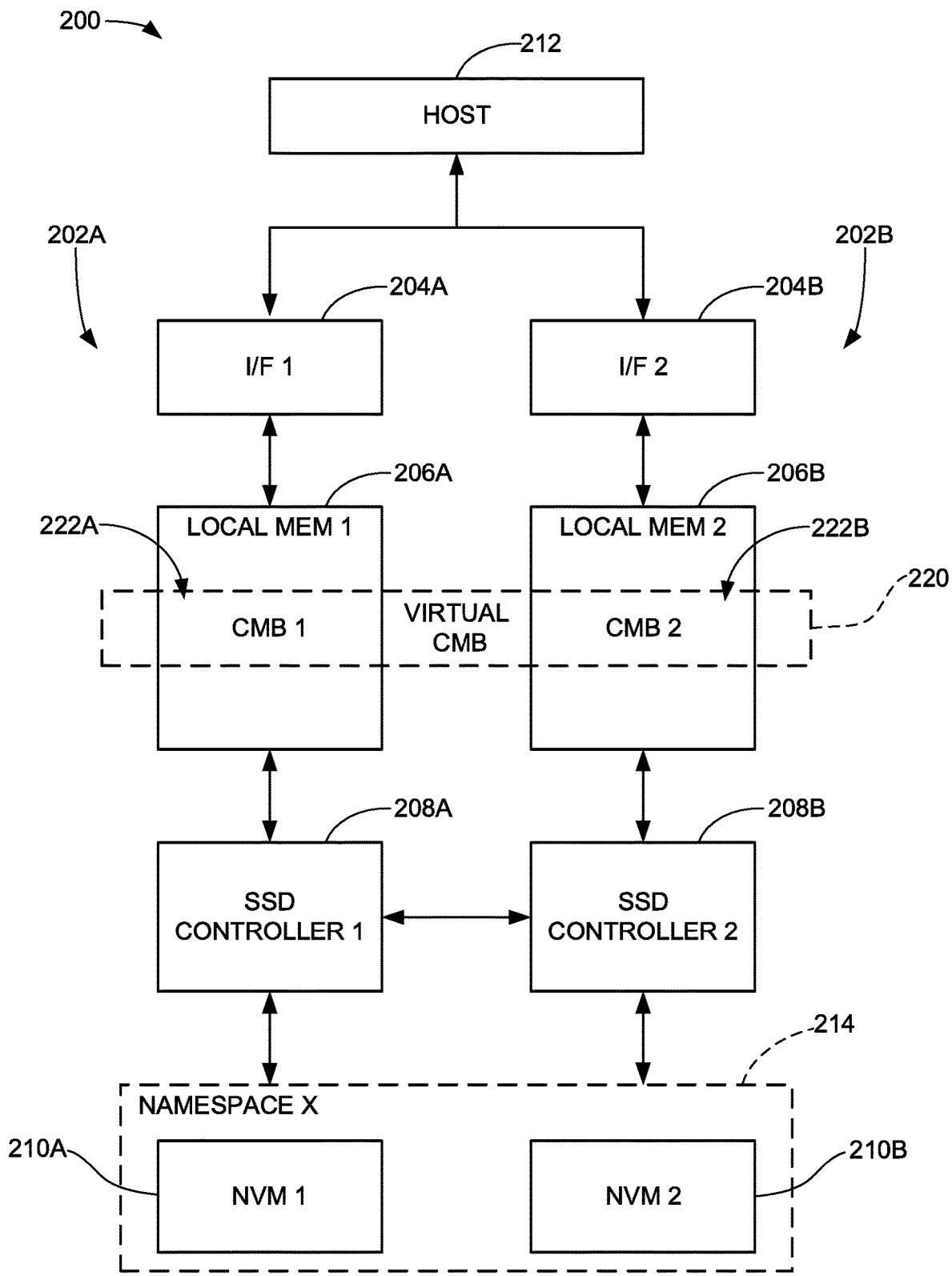
FIG. 7 shows a data storage system with two SSDs nominally identical to the SSD of FIG. 2 that utilize a virtual controller memory buffer to transfer data in accordance with various embodiments.

FIG. 7 shows a data storage system 200 in accordance with further embodiments. The system 200 includes two data storage devices 202A and 202B, nominally identical to the SSDs discussed above. Each of the SSDs 202A, 202B include an interface (I/F) circuit 204A, 204B; a local memory 206A, 206B; an SSD controller 208A, 208B; and an NVM (flash memory) 210A, 210B. In the present example, a host 212 (corresponding to the hosts 101, 172 discussed above) forms a namespace 214 (Namespace X) that utilizes at least a portion of each of the respective NVMs 210A, 210B. In the present embodiment, it is contemplated that the namespace 214 includes the entire storage capacity of each NVM, although such is not required. While two SSDs are shown in FIG. 7, it will be appreciated that the present embodiment can be extended to any number of SSDs and/or other storage devices.

The host 212 implements a virtual controller memory buffer (VCMB) 220. The VCMB incorporates separate physical portions 222A, 222B of the local memories 206A, 206B as shown. As discussed below, from the host standpoint the VCMB 220 is a single, unitary memory with a single range of memory addresses used as a controller memory buffer (CMB) space such as described in FIGS. 5-6B. These respective portions of the local memories 206A, 206B are denoted as CMB 1 and CMB 2. The two portions may be the same size, or one may be larger than the other as required.

The host 212 utilizes the VCMB 220 as required, including for the storage of commands and associated data for data transfers with the namespace 214. For example, as discussed above, the host 212 may issue virtualized read, write and flush commands to the VCMB 220 for execution by the respective controllers 208A, 208B to transfer or otherwise alter the data stored in the NVMs 210A, 210B.

A number of different controller strategies can be implemented by the system. In one embodiment, a peer-to-peer arrangement is used where each of the controllers concurrently receives virtualized commands from the host, referred to as virtual command sets (VCSs). Each controller independently extracts from the VCS one or more local commands pertaining to the associated controller, and executes that portion of the virtual command set that can be performed by that storage device. In this scenario, little or no communication or coordination takes place between the respective controllers, as each controller performs that portion of the virtual command set that it can accomplish.

In other embodiments, the respective controllers utilize a more coordinated approach, with communications therebetween including the passage of commands, data, status information, etc. as required to ensure completion of the virtual command set.

Figure 8:
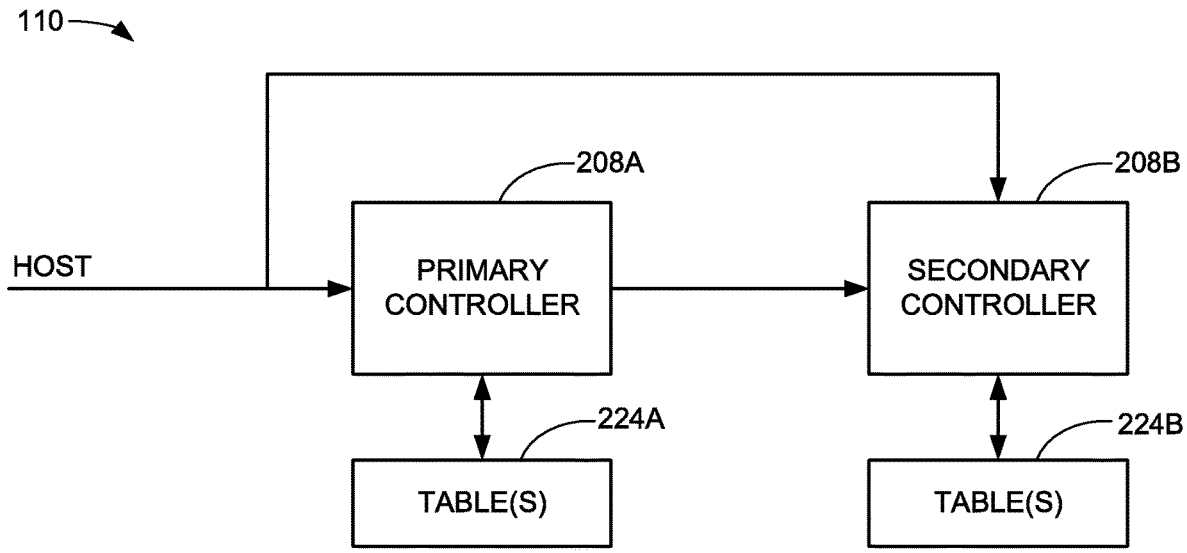
FIG. 8 illustrates the processing of virtual command sets from the host in FIG. 7 in some embodiments.

FIG. 8 shows aspects of the system 200 from FIG. 7 in some embodiments, including the respective controllers 208A, 208B. As noted above, in some embodiments, virtual command sets are issued by the host and presented to each controller, which operates to extract and utilize that portion of the command associated with the corresponding SSD.

In other embodiments, a first one of the controllers, in this case SSD controller 208A, is designated as a primary controller. The remaining SSD controller 208B is designated as a secondary controller. In this scenario, the primary controller 208A initially evaluates the VCS to determine whether the command affects only data stored in the first SSD 202A, or whether the command will alternatively and/or additionally affect data stored in the second SSD 202B. As required, communications may take place between the respective controllers to process the VCS. In other cases, both controllers may evaluate each VCS with rules or other mechanisms in place to select the appropriate controller to take the lead on the processing of the VCS.

Each of the controllers 208A, 208B may maintain one or more tables 224A, 224B to track the progress of each VCS issued by the host. In this way, the primary controller 208A operates as a virtual controller for the virtualized controller memory buffer 220, as well as for the namespace 214. This is not necessarily required, however, as both controllers can coordinate the processing of the various VCSs issued by the host as peers, as discussed above.

Figure 9:
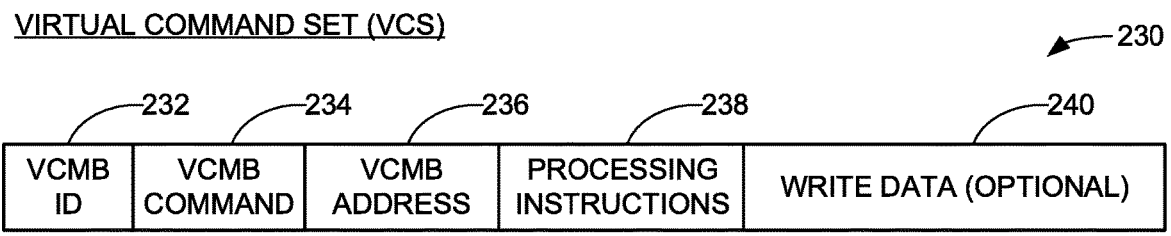
FIG. 9 shows an exemplary format for a virtual command set (VCS) from the host.

FIG. 9 shows an example format for a selected virtual command set (VCS) 230 issued by the host. The format is provided merely for purposes of illustration and is not limiting, in that other formats can readily be used. The format of FIG. 9 includes a VCMB identification (ID) field 232, a VCMB command field 234, a VCMB address field 236, a processing instructions field 238 and an optional write data field 240.

The VCMB ID field 232 stores a VCMB ID as a unique identifier for the associated VCMB command in field 234. As noted above, the VCMB commands can take a variety of forms, including otherwise conventional NVMe commands such as write, read, flush, etc. The commands may be 64 bytes (B) or some other suitable length, and will include various additional information such as logical block addressing, etc. of the type required to enable the associated controller(s) to carry out the required action.

The processing instructions in field 238 may direct certain actions by the associated controller(s) with regard to the command, such as where read data are to be placed at the completion of a read command, whether a delay or other time limit is assigned to the completion of the command, and so on. The optional write data in field 240 may be supplied with the command to be written to the namespace 214 when the write command is written.

As with conventional SSDs (and other forms of storage devices), writeback caching techniques can be used so that the virtualized controller reports a command complete action once the write command is received, to not delay further operations by the host. In some cases, a copy of the write data may be immediately placed in NVM memory (e.g., local flash buffer, etc.) to provide persistent storage of the write data in the event of an inadvertent power loss. The write operation is thereafter scheduled and carried out at a suitable time.

Figure 10:
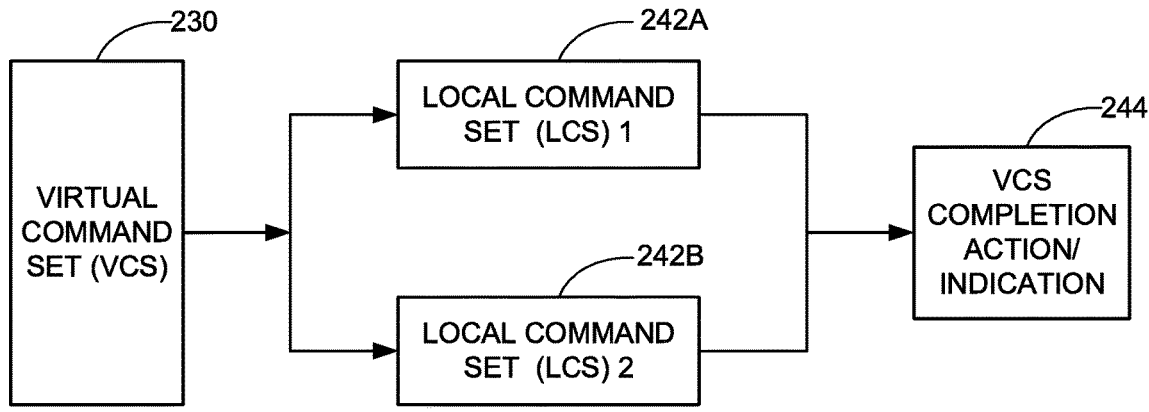
FIG. 10 illustrates extraction of local command sets from the VCS in FIG. 9 in some embodiments.

FIG. 10 shows the generation of local command sets 242A, 242B from the virtual command set 230 from FIG. 9 in some embodiments. In this example, the virtual command set (VCS) 230 includes actions that require operation by both controllers 208A, 208B. In such case, the VCS 230 is divided into and otherwise formatted to generate the two local command sets (LCSs), each of which can be serviced independently by the respective SSD.

As noted above, each controller can separately extract that portion of the virtual command set that is relevant for the associated SSD, leaving the other SSD to handle the rest. Alternatively, one of the controllers can initially evaluate and perform this division, including forwarding the non-related portion of the command set to the other controller.

Once the local commands are executed (or otherwise processed), an appropriate VCS completion action/indication/status is assembled and provided back to the host, as indicated by block 244.

To give a concrete illustration, if the VCS 230 instructs certain data sets to be flushed from the namespace, the appropriate data blocks in each SSD are identified and separately cleared as required by the individual drives. Similarly, a virtual read command may be divided out into two separate read commands that are used to retrieve the respective data stored in each SSD, and a virtual write command may be divided into two write commands to write the indicated data as required.

In some cases, level loading techniques may be applied so that a first set of blocks of data are written to one of the NVMs and the next set of blocks of data are written the other NVM. In this way, fewer data transfers are required and the need to break up each write command to evenly distribute the presented blocks is reduced. Over time, adjustments can be made to ensure the loading is nominally equally shared by each drive. Statistics on data usage can be maintained and, as required, background transfers of blocks between the SSDs can be carried out to enhance readback performance. Of course, there is no need to transfer older version data that will be subjected to garbage collection anyway, so the adjustments may be made such that certain logical block addresses (LBAs) or other ranges of the data can be assigned to one or the other drive for future transfers.

Figure 11:
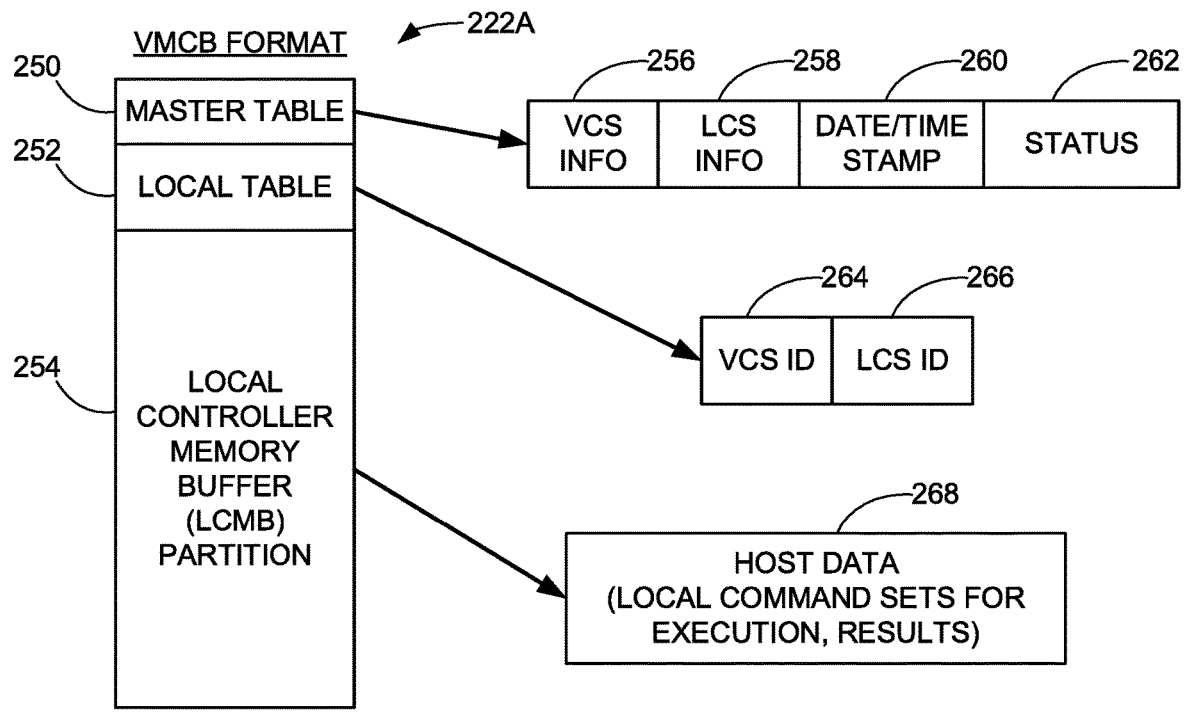
FIG. 11 shows an exemplary format for the virtual controller memory buffer (VCMB) of FIG. 7 in some embodiments.

FIG. 11 is an example format for aspects of the VCMB 220 from FIG. 7 in some embodiments. As before, it will be appreciated that the format is merely exemplary and is not limiting. It will be appreciated that the format in FIG. 7 represents the CMB1 local portion of the controller memory 206A in SSD 202A. A similar format can be maintained in the other SSD 202B.

The data structure includes a master table 250, a local table 252 and a local controller memory buffer portion 254. The master table 250 can be used to provide top level tracking of the various virtual command sets provided by the host. In one example format, the master table includes a number of entries, each having a VCS information field 256, an LCS information field 258, data/time stamp information field 260 and a status field 262. The VCS and LCS information may pertain to the various VCSs issued by the host, including tracking how (as required) each particular VCS has been divided out for processing. The date/time stamp information can signify timing information regarding the receipt and servicing of the commands, and the status information can indicate whether the VCS has been completed, is in process, etc.

The local table(s) 252 are intended to provide local tracking of the various commands in the local buffer 254. In some cases, a VCS identification value (see e.g., field 232 in FIG. 9) in field 264 can be correlated to a corresponding LCS identification value in field 266, to provide a virtual-to-local transition layer for the locally processed local commands. Other types of data may be stored by the local tables as well. The main controller memory buffer partition 254 stores host data 268 as required, including the various local command sets and data pending execution by the local controller, etc.

Figure 12:
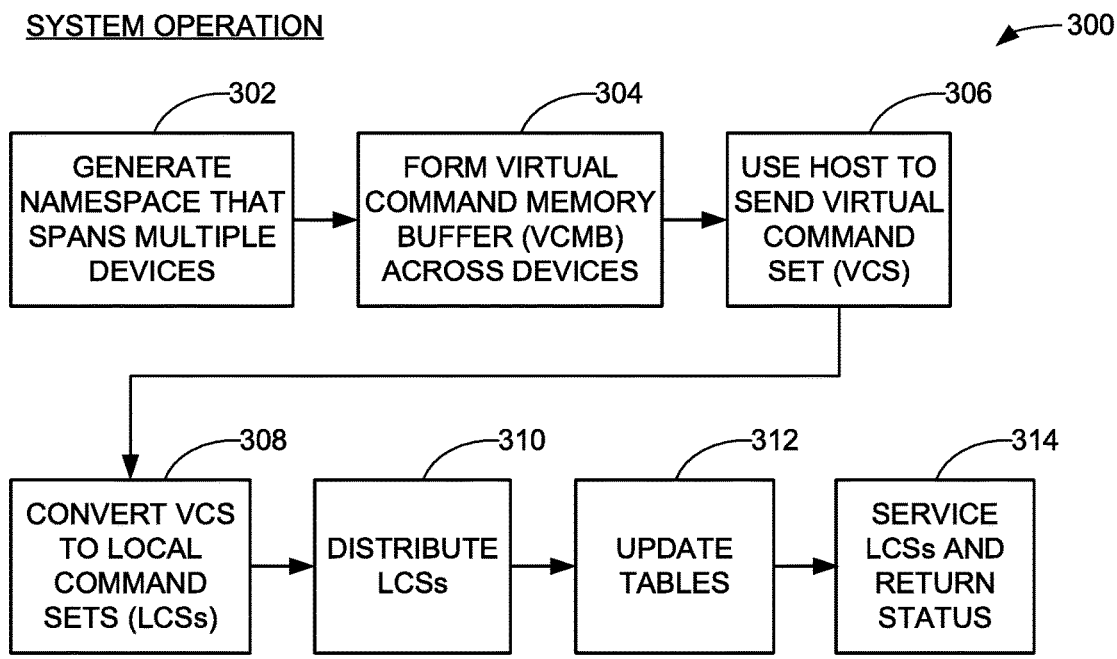
FIG. 12 is a sequence diagram to illustrate operation of the system of FIG. 7 in some embodiments.

FIG. 12 provides a sequence diagram for a system operation routine 300 carried out by an exemplary system such as the system 200 in FIG. 7 in accordance with various embodiments. Block 302 commences with the generation of an NVMe namespace that spans multiple storage devices, such as but not limited to the two SSDs shown in FIG. 7. A virtual controller memory buffer (VCMB) is next formed at block 304 to span the local controller memory of at least some of the storage devices that form the namespace. These operations may be initiated by the host (e.g., host 212) in cooperation with the respective controllers of the storage devices. Various decisions such as block sizes, capacity, virtual or logical block addressing requirements, etc. will be carried out at this time to configure the respective buffer and NVM spaces.

Once configured, system operation is carried out beginning at block 306 to transfer data between the host and the designated namespace(s). As part of this operation, from time to time the host will issue a virtual command set (VCS) to the VCMB for processing.

As shown by block 308, the VCS will be evaluated and, as required, converted into one or more local command sets (LCSs) to describe the local command processing necessary to carry out the VCS. The LCSs are processed by/distributed to the appropriate storage devices at block 310 for storage in the individual local controller memory partitions.

At block 312, tables such as the master table and local table described in FIG. 11 are next updated to track and coordinate the execution of the local commands and, as required, provide the appropriate actions and status information to the host, block 314, at the conclusion of the command execution sequence(s).

It will now be appreciated that the various embodiments present a number of benefits. Virtualizing the local controller memory buffer (CMB) operations across multiple devices can advantageously enable the host to more efficiently utilize local controller space during data transfer operations involving a multi-device NVMe namespace. Simplified communications are provided since the host need not track the physical locations of the local virtual buffer, nor the locations of the respective data blocks in the various NVMs that form the namespace. The virtualized buffer further enables the host to acquire a significantly larger local controller memory buffer, which can further enable tasks that otherwise could not be carried out due to capacity constraints upon the available local controller memory.

While various embodiments presented herein have been described in the context of the use of SSDs, it will be appreciated that the embodiments are not so limited as any number and types of data storage configurations can be used, including NVMe environments that support deterministic (IOD) modes of operation in which guaranteed levels of performance are specified.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
coupling a host device to each of first and second data storage devices, the first data storage device comprising a first controller, a first local memory and a first non-volatile memory (NVM), the second data storage device comprising a second controller, a second local memory and a second NVM;
allocating a virtual controller memory buffer comprising a dedicated portion of each of the first and second local memories for control by the host device; and
using the first controller to receive a virtual command set from the host device and extract a first local command therefrom for execution to transfer data between the host device and the first NVM.

2. The method of claim 1, wherein the first controller further extracts a second local command from the virtual command set and forwards the second local command to the second controller for execution to transfer data between the host device and the second NVM.

3. The method of claim 1, further comprising using the second controller to concurrently receive the virtual command set from the host device and extract a second local command therefrom for execution to transfer data between the host device and the second NVM.

4. The method of claim 1, further comprising generating an NVMe (Non-Volatile Memory Express) namespace that spans at least a portion of the first NVM and at least a portion of the second NVM, wherein the virtual command set comprises an access command to transfer data between the host device and the NVMe namespace.

5. The method of claim 1, wherein the first controller is characterized as a primary controller and the second controller is characterized as a secondary controller, the primary controller configured to evaluate the virtual command set from the host, generate a first local command set and a second local command set therefrom, store the first local command set in the dedicated portion of the first memory, and transfer the second local command set to the secondary controller for storage in the dedicated portion of the second memory.

6. The method of claim 1, wherein each of the first and second NVMs comprise non-volatile flash memory, and wherein each of the first and second local memories comprise volatile random access memory (RAM).

7. The method of claim 1, further comprising generating and storing, in at least a selected one of the first or second local memories, a master table as a data structure that tracks each of a number of virtual command sets issued by the host device to the virtual controller memory buffer.

8. The method of claim 1, further comprising using each of the first and second controllers to generate and maintain a local table as a data structure in the associated first and second local memories, each local table tracking the associated local commands to be executed by the respective first and second controllers to transfer data between the associated first and second NVMs responsive to a sequence of virtual command sets from the host device.

9. The method of claim 1, wherein the virtual command set comprises a read command to read data from the first and second NVMs.

10. The method of claim 9, wherein responsive to the read command from the virtual command set, the respective first and second controllers retrieve requested readback data from the first and second NVMs and place the retrieved requested readback data in the respective dedicated portions of the first and second local memories that make up the virtual controller memory buffer.

11. The method of claim 1, wherein the virtual command set comprises a write command to write a first set of write data to the first NVM and a second set of write data to the second NVM, the first controller storing a copy of the first set of write data in the dedicated portion of the first local memory, the second controller storing a copy of the second set of write data in the dedicated portion of the second local memory.

12. An apparatus comprising:
a first data storage device comprising a first controller, a first local controller memory and a first non-volatile memory (NVM), the first local controller memory used to store programming routines and control data for the first controller, the first NVM serving as a first main store for host data;
a second data storage device comprising a second controller, a second local controller memory and a second NVM, the second local controller memory used to store programming routines and control data for the second controller, the second NVM serving as a second main store for host data;
a host device configured to designate at least a portion of the first NVM and at least a portion of the second NVM as an NVMe (Non-Volatile Memory Express) namespace, to allocate a first dedicated portion of the first local controller memory and a second dedicated portion of the second local controller memory as a virtual controller memory buffer (CMB), and to direct a virtual command set to the virtual CMB to transfer data between the host device and the NVMe namespace, the first controller dividing the virtual command set into a first local command for execution by the first controller and a second local command for execution by the second controller to service the virtual command set.

13. The apparatus of claim 12, wherein the first and second data storage devices are each characterized as a solid-state drive (SSD), the first and second controllers each comprising a programmable processor, the first and second NVMs each comprising flash memory, and the first and second local controller memories each comprising volatile random access memory (RAM).

14. The apparatus of claim 12, wherein the first controller temporarily stores the first local command in the dedicated portion of the first local controller memory prior to transfer to a first command queue for execution thereof, and the second controller temporarily stores the second local command in the dedicated portion of the second local controller memory prior to transfer to a second command queue for execution thereof.

15. The apparatus of claim 12, wherein the virtual CMB comprises a single range of host memory addresses across the respective dedicated portions of the first and second local controller memories.

16. The apparatus of claim 12, wherein the virtual command set comprises at least one command to write data to the namespace, to read data from the namespace, or flush data from the namespace.

17. The apparatus of claim 12, wherein the at least one command comprises a read command, and data retrieved from the namespace is stored, by the first and second controllers, in the virtual CMB.

18. A solid-state drive (SSD), comprising:
a non-volatile memory (NVM) comprising flash memory;
a volatile local memory; and
an SSD controller circuit comprising at least one programmable processor configured to designate at least a portion of the NVM as an NVMe (Non-Volatile Memory Express) namespace for a selected host, to designate at least a portion of the volatile local memory as a portion of a virtual controller memory buffer (VCMB) for dedicated use by the selected host, to receive a virtual command set from the selected host to transfer data between the selected host and the NVMe namespace, to extract a first command portion of the virtual command set associated with the NVM, and to execute the extracted first command portion of the virtual command set without executing a remaining second command portion of the virtual command set not associated with the NVM.

19. The SSD of claim 18, wherein the SSD controller circuit is further configured to forward the remaining second command portion to a neighboring SSD having a second NVM that forms a portion of the NVMe namespace.

20. The SSD of claim 18, wherein the extracted first command portion of the virtual command set comprises a read command to retrieve selected read data from the NVM, and wherein the SSD controller circuit further operates to store the retrieved selected read data in the VCMB for subsequent transfer to the host device.

* * * * *